United States Patent [19]
Carter

[11] 3,773,309
[45] Nov. 20, 1973

[54] COIL SPRING SPACER

[75] Inventor: Warren E. Carter, Murfreesboro, Tenn.

[73] Assignee: Perfect Equipment Corp., Murfreesboro, Tenn.

[22] Filed: May 30, 1972

[21] Appl. No.: 257,778

[52] U.S. Cl. ............................................. 267/61 S
[51] Int. Cl. ................................................ F16f 1/16
[58] Field of Search ............................ 267/61, 61 S

[56] References Cited
UNITED STATES PATENTS
3,591,161  7/1971  Fister et al. ......................... 267/61 S
3,198,508  8/1965  Melton et al. ....................... 267/61 S

*Primary Examiner*—James B. Marbert
*Attorney*—Harrington A. Lackey

[57] ABSTRACT

A spacer device for a coil spring including a hard resilient body having an arcuate seat on at least one end portion of the body and a U-shaped socket fixed to the end portion of the body to span the arcuate seat and open laterally of the body for receiving a convolution of the coil spring. When both end portions of the spacer are positioned between the spring convolutions, the axial inward pressure of the convolution received in the socket forces one leg of the socket into the seat and simultaneously causes both legs of the socket to flex around the convolution.

9 Claims, 9 Drawing Figures

PATENTED NOV 20 1973 3,773,309
Fig.1 Fig.2
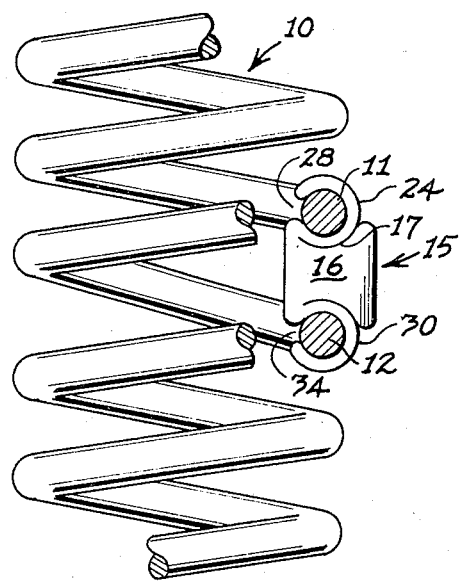
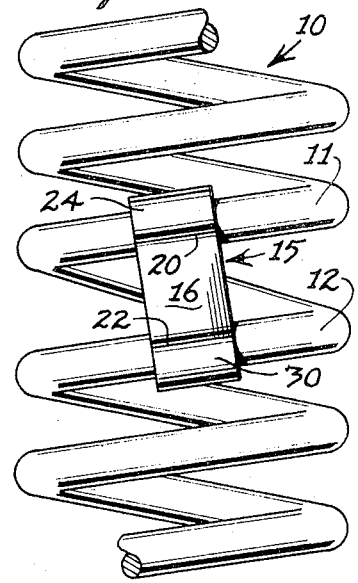
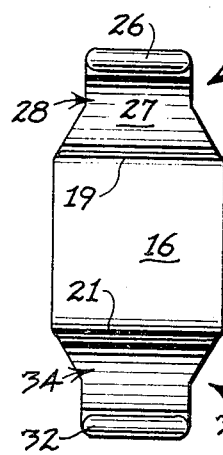
Fig.3
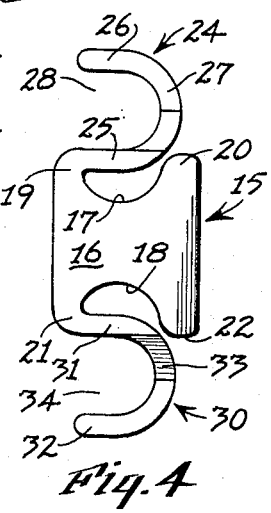
Fig.4
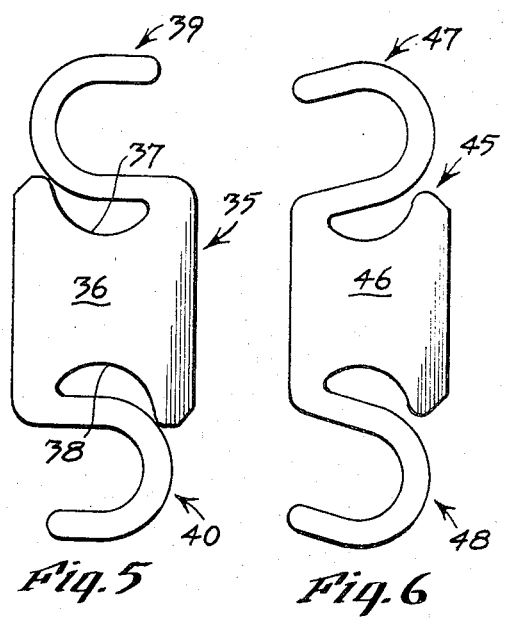
Fig.5   Fig.6
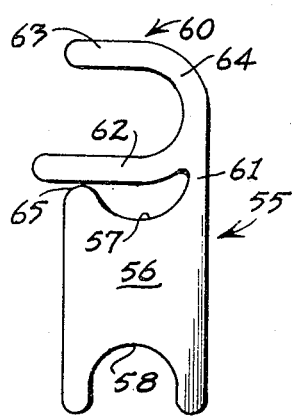
Fig.7
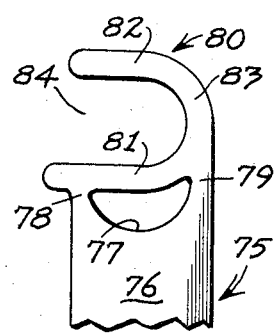
Fig.8
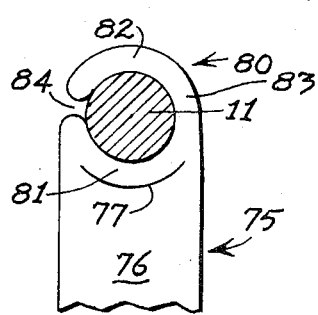
Fig.9

COIL SPRING SPACER

BACKGROUND OF THE INVENTION

This invention relates to a coil spring spacer, and more particularly to a spacer for adjacent convolutions in a coil spring.

The overall height of the coil spring, such as a coil spring used in the suspension system of a motor vehicle, may decrease after the spring has been subjected to sustained loads as a result of the spring taking a permanent set. Such reduction in overall height of one or more of the coil springs results in sagging of the suspension of the vehicle and causes improper alignment of its wheels; inability of the spring suspension system to support normal loads; excessive wear on tires; and impairment of the riding and driving qualities of the vehicle.

Various types of spacers or boosters have been developed to fit over adjacent convolutions of a coil spring, particularly in the suspension system of motor vehicles. Examples of such spring spacers are disclosed in the Blythe U.S. Pat. Nos. 2,673,084 and 2,801,841, the Ernest U.S. Pat. No. 2,924,447 and the Melton U.S. Pat. Nos. 3,141,661 and 3,198,508. Most of these patent disclose convolution seats in the opposite end portions of a body facing in opposite axial directions which merely serve as spacers without much lateral support. The Melton U.S. Pat. No. 3,198,508 discloses a spacer having laterally directed snap-acting sockets which are forced over the convolutions.

SUMMARY OF THE INVENTION

It is therefore an object of this invention to provide a coil spring spacer adapted for insertion between adjacent convolutions to adjust the effective length of the coil spring normally under compression between the two bodies, and particularly, although not limited to, the application to coil springs used in automobile running gear and suspension systems.

Another object of this invention is to provide a coil spring spacer or booster having laterally directed openings in sockets on the opposite ends of the spacer for placement around convolutions of the coil spring, and so designed that sockets will roll form around each convolution as the spring load is brought to bear upon the ends of the spacer, forcing the legs or walls of the socket to automatically lock or set around each convolution. Moreover, the sockets are so designed that in inoperative position, the openings are greater than the diameter of the convolutions so that the scokets fit or slide freely over the convolutions until the pressure of the convolutions upon the opposite ends of the spacer force the sockets to close about them.

The spacer made in accordance with this invention, although susceptible to many different modifications, essentially comprises an elongated body of hard resilient material, such as a high density synthetic resin having an arcuate end, preferably at each end of the body. A laterally directed U-shaped socket having substantially parallel legs and a bight portion are fixed to the end of the body so that the inner leg spans the arcuate seat, and the opening between the legs, in operative position is greater than the diameter of the convolution to be received in that socket. As the convolution is received in the socket and pressure brought to bear inwardly of the body, the inner leg is forced down into and ultimately against the arcuate seat, simultaneously causing the bight portion and the outer leg of the U-shaped socket to curl around the convolution until the opening or slot between the free ends of the legs is substantially less than the diameter of the convolution. Thus, the convolution is securely bound and locked in the socket of the spacer. Preferably, the socket is permanently set by virtue of the plastic resin employed in the spacer to hold the convolution spaced apart from an adjacent convolution at the opposite end of the spacer indefinitely.

Although other types of convolution receiving means may be employed on the opposite end of the spacer, nevertheless it is preferred that the arcuate seat and the spanning socket be employed at both ends of the spacer so that both adjacent convolutions are locked in spaced apart position and held there against lateral as well as axial thrust, vibrations and other forces acting upon the coil springs.

BRIEF DESCRIPTION OF THE DRAWINGS

FIG. 1 is a fragmentary side elevation of a coil spring, disclosing a spacer in side elevation mounted in operative position upon a pair of spaced convolutions;

FIG. 2 is a front elevation of the coil spring and spacer disclosed in FIG. 1;

FIG. 3 is an enlarged rear elevation of the spacer disclosed in FIG. 2, in inoperative position;

FIG. 4 is a side elevation of the spacer disclosed in FIG. 3;

FIG. 5 is an enlarged view similar to FIG. 4 disclosing a first modified spacer;

FIG. 6 is a side elevation of a second modified spacer;

FIG. 7 is a side elevation of a third modified spacer;

FIG. 8 is a fragmentary side elevation of a fourth modified form of spacer; and

FIG. 9 is a view similar to FIG. 8 disclosing the spacer in operative position receiving a convolution.

DESCRIPTION OF THE PREFERRED EMBODIMENT

Referring now to the drawings in more detail, FIGS. 1 and 2 disclose a fragment of a coil spring 10, such as those used in the suspension systems of motor vehicles, and being formed of helical convolution such as 11 and 12.

Supporting a pair of adjacent convolutions 11 and 12 in fixed spaced relationship is the spacer device 15. Spacer device 15 is preferably formed of a single, unitary, preferably molded, elongated body 16, preferably of rectangular cross-section and of a hard, relatively rigid, but resilient, material having substantial mechanical strength, such as a high density synthetic resin such as polyethylene or other similar resins.

Formed transversely depthwise across each end portion of the body 16 is an arcuate seat 17 and 18 (FIG. 4). The seats 17 and 18 face axially outward in opposite directions, and each seat is provided with side edges 19 and 20, and 21 and 22, respectively, extending transversely depthwise, and therefore being spaced apart transversely widthwise.

Fixed to one end, the upper end as disclosed in the drawings, of the body 16 is the first or upper socket 24 having an inner leg 25, an outer leg 26, and a bight portion 27 connecting the legs 25 and 26. The free ends of the legs 25 and 26 form a slot or opening 28, which, in the inoperative position of the socket 24, is greater than the diameter of the convolution 11 of the spring 10.

The free end of the lower or inner leg 25 is fixed to the edge portion 19 of the seat 17. In the spacer 15, the socket 24 and the body 16 are preferably formed integrally, by molding, of the same high density synthetic resin material. The inner and outer legs 25 and 26 are substantially parallel, and normal to the longitudinal axis of the body 16. The inner leg 25 substantially spans the seat 17 so that it is spaced above the seat 17 with the closed end of the inner leg 25 and the bight portion 27 proximately spaced to, or even abutting, the seat edge 20, in inoperative position.

Fixed on the opposite or lower end of the body 16 is preferably another socket 30, which is the mirror image of the socket 24. The lower socket 30 is also U-shaped and provided with an inner leg 31, the free end of which is integrally fixed to the edge portion 21 of the seat 18, and is also provided with the outer leg 32 and the connecting bight portion 33. The free ends of the legs 31 and 32 form the entry opening or slot 34. The socket 30 is of the identical dimensions and made of the same material as the socket 24.

The spacer 15 is positioned so that the convolution 11 will pass through the entry opening 28 and the convolution 12 will pass through the entry opening 34 until the respective convolutions 11 and 12 are seated against the bight portions 27 and 33 and against the respective inner legs 25 and 31. Since the entry openings 28 and 34 are greater than the diameter of the convolutions 11 and 12, sockets 24 and 30 may be easily positioned over the respective convolutions 11 and 12 without forcing, except to separate the convolutions 11 and 12 if they are unduly sagging or contracted. If this is the situation, then convolutions 11 and 12 must be forced apart until their spacing is comparable to the spacing between the sockets 24 and 30.

After the convolutions 11 and 12 are properly seated in their corresponding sockets 24 and 33, the axial load upon the spring 10 will cause the convolutions 11 and 12 to contract toward each other, thereby compressing the inner legs 25 and 31, respectively, causing them to flex into their respective seats 17 and 18. If the load is sufficiently great, compression and flexing of the inner legs 25 and 31 will continue until the legs 25 and 31 bear flush against the respective arcuate seats 17 and 18, as disclosed in FIG. 1. As the inner legs 25 and 31 flex into their respective seats, the bight portions 27 and 33 and the outer legs 26 and 32 will be caused to curl or close around the respective convolutions 11 and 12, narrowing the respective entry slots 28 and 34 until they assume the positions disclosed in FIG. 1. In the resultant operative or closed positions of FIG. 1, the convolutions 11 and 12 are tightly bound and secured in spaced relationship and within the respective sockets 24 and 30. Closing of the sockets 24 and 30 and the respective narrowing of the slots 28 and 34 to dimensions substantially less than the diameters of the respective convolutions 11 and 12 prevent the convolutions 11 and 12 from moving in any direction regardless of the axial or lateral thrusts or vibrations exerted upon the spring 10 and consequently upon the spacer 15.

The high density polyethylene or other type of synthetic resin is selected because it will tend to permanently set after being formed into the locked or operative position of the spacer 15 disclosed in FIG. 1. Thus, removal of the spacer 15 is almost impossible short of destruction of the spacer 15.

FIG. 5 discloses a modified form of spacer 35 having a body 36, seats 37 and 38 and sockets 39 and 40. The construction of the spacer 35 is identical to the construction of the spacer 15 except that the sockets 39 and 40 are facing or directed in opposite lateral directions. Otherwise, the function of the spacers 35 and 15 are the same.

In the modified spacer 45 of FIG. 6, the construction is also the same as the spacer 15, with the exception that the sockets 47 and 48 have their legs converging at acute angles to the longitudinal axis of the body 46.

In the spacer 55 of FIG. 7 the main body 56 is provided with an upper arcuate seat 57 and an identical lower arcuate seat 58. However, the socket 60, although still U-shaped, is connected to one edge portion 61 of seat 57 at the juncture between the inner leg 62 and the bight portion 64. The inner leg 62 is slightly longer than the upper or outer leg 63 so that it will bear upon the other edge 65 of the seat 57. FIG. 7 also illustrates a spacer 55 provided with only a single socket 60, which will function and close in the same manner as the socket 24, but the opposite end of the spacer 56 is provided with no socket and relies only on the arcuate seat 58 to fit over the convolution 12. It will be understood that a single socket and an opposite seat, such as 58 may be employed in any of the modified spacers illustrated in the drawings. By the same token, another socket which is the mirror image of socket 60 can be formed on the opposite end of the body 56 so that its inner leg will span the arcuate seat 58.

The modified spacer 75 of FIG. 8 includes a body 76 having an upper arcuate seat 77 with both sides edges 78 and 79 integrally formed with opposite end portions of the inner leg 81 of the socket 80. The upper or outer leg 82 and the bight portion 83 of the socket 80 are identical to the corresponding elements of the socket 60 of FIG. 7, with the exception of the dual connection of the lower leg 81 to the edges 78 and 79 of the arcuate seat 77.

FIG. 9 illustrates the operative position of the spacer 75 of FIG. 8, showing the inner leg 81 compressed and flexed flush against the arcuate seat 77, and the upper leg 82 flexed around the convolution 11 to almost close the entry slot 84.

What is claimed is:

1. A device for supporting in spaced apart relationship adjacent convolutions in a coil spring, comprising:
    a. an elongated body having a longitudinal axis and first and second opposite end portions, and having widthwise and depthwise dimensions,
    b. an arcuate seat formed depthwise in said first end portion and having opposed edge portions spaced widthwise,
    c. a substantially U-shaped socket having inner and outer legs connected by a bight portion, for receiving a convolution,
    d. said inner leg being fixed to at least one of said edge portions to span said arcuate seat so that said inner leg is normally spaced from said seat,
    e. the free ends of said legs defining a slot that will accommodate the diameter of the convolution to be received in said socket,
    f. seat means on said second end portion for receiving a convolution,
    g. said inner leg being adapted, when a first convolution is received in said socket and a second adjacent convolution is received in said seat means, to flex toward said seat under the axial pressure of said first convolution created by the contraction of said coil spring, and to cause said outer leg to flex around said first convolution so that said slot is less than the diameter of said first convolution.

2. The invention according to claim 1 in which said body and said socket are integrally formed of a hard resilient material.

3. The invention according to slaim 1 in which the free end of said inner leg is fixed to one of said edge portions.

4. The invention according to claim 1 in which the portion of said inner leg adjacent said bight portion is fixed to one of said edge portions.

5. The invention according to claim 1 in which a portion of the inner leg adjacent said free end is fixed to one of said edge portions and a portion of said inner leg adjacent said bight portion is fixed to said other edge portion.

6. The invention according to claim 1 in which said inner leg and outer leg are substantially parallel and normal to said longitudinal axis in inoperative position.

7. The invention according to claim 1 in which said inner leg and outer leg are substantially parallel to each other and extend at an acute angle to said longitudinal axis.

8. The invention according to claim 1 in which said U-shaped socket comprises a first socket, and said seat means comprises a seat on said second end portion, and a second socket similar to said first socket and having an inner leg fixed to at least one edge portion of said second seat.

9. The invention according to claim 8 in which the slots in said first and second sockets are on opposite sides of said body.

* * * * *